(12) United States Patent
Karoji

(10) Patent No.: US 9,019,308 B2
(45) Date of Patent: Apr. 28, 2015

(54) DISPLAY APPARATUS AND COMPUTER-READABLE MEDIUM

(75) Inventor: Kosuke Karoji, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 216 days.

(21) Appl. No.: 13/214,392

(22) Filed: Aug. 22, 2011

(65) Prior Publication Data

US 2012/0050328 A1 Mar. 1, 2012

(30) Foreign Application Priority Data

Aug. 26, 2010 (JP) ................................ 2010-189687
Mar. 29, 2011 (JP) ................................ 2011-072965

(51) Int. Cl.
*G09G 5/00* (2006.01)
*G06K 9/00* (2006.01)

(52) U.S. Cl.
CPC ................................ *G06K 9/00402* (2013.01)

(58) Field of Classification Search
CPC ............................. G09G 4/40; H04N 5/44504
USPC .................................................. 345/635, 636
See application file for complete search history.

(56) References Cited

U.S. PATENT DOCUMENTS

| 5,157,737 | A | | 10/1992 | Sklarew |
| 5,450,537 | A | * | 9/1995 | Hirai et al. ................ 715/200 |
| 5,864,636 | A | * | 1/1999 | Chisaka ...................... 382/189 |
| 7,181,068 | B2 | * | 2/2007 | Suzuki et al. .............. 382/229 |
| 7,791,589 | B2 | | 9/2010 | Sawada |
| 8,174,502 | B2 | * | 5/2012 | Bolsinga et al. ............ 345/173 |
| 2003/0015355 | A1 | * | 1/2003 | Kao et al. .................. 178/18.01 |
| 2004/0054701 | A1 | * | 3/2004 | Garst .......................... 708/131 |
| 2004/0085301 | A1 | | 5/2004 | Furukawa et al. |
| 2005/0180633 | A1 | | 8/2005 | Williamson et al. |
| 2006/0001667 | A1 | * | 1/2006 | LaViola et al. ............. 345/473 |

(Continued)

FOREIGN PATENT DOCUMENTS

| CN | 1493961 A | 5/2004 |
| CN | 1848108 A | 10/2006 |
| JP | 01130249 A | 5/1989 |
| JP | 2009-080615 A | 4/2009 |

OTHER PUBLICATIONS

Laviola J. J., Zeleznik R. C.: Mathpad2: a system for the creation and exploration of mathematical sketches. ACM Trans. Graph. 23, 3 (2004), 432-440.*

(Continued)

*Primary Examiner* — Devona Faulk
*Assistant Examiner* — Jin Ge
(74) *Attorney, Agent, or Firm* — Holtz, Holtz, Goodman & Chick PC

(57) ABSTRACT

In a display apparatus, a processor performs an information storing process of storing the displayed information to be correlated with the locus of the handwriting recognized by the recognition process in the memory, when it is determined by the handwriting position determining process that the locus of the handwriting position is superposed on the information which is displayed on the display unit, and an information output process of reading and outputting the information, which is stored in the memory to be correlated with the handwritten locus recognized by the recognition process by the information storing process, when it is determined by the handwriting position determining process that the locus of the handwriting position is not superposed on the information which is displayed on the display unit.

14 Claims, 16 Drawing Sheets

(56) References Cited

U.S. PATENT DOCUMENTS

| | | | |
|---|---|---|---|
| 2006/0208085 A1 | 9/2006 | Cohen et al. | |
| 2007/0177801 A1* | 8/2007 | Kawamoto et al. | 382/187 |
| 2007/0233771 A1* | 10/2007 | Ito | 708/530 |
| 2008/0150910 A1 | 6/2008 | Nakajima | |
| 2009/0002334 A1* | 1/2009 | Karoji | 345/173 |
| 2009/0002392 A1* | 1/2009 | Hou et al. | 345/619 |
| 2009/0307587 A1* | 12/2009 | Kaneko | 715/700 |
| 2011/0190053 A1* | 8/2011 | Kawamoto et al. | 463/31 |

OTHER PUBLICATIONS

U. Garain and B. B. Chaudhuri. Recognition of Online Handwritten Mathematical Expressions. IEEE Trans. Sys. Man Cybern. Part B:Cybern., 34(6):2366-2376, Dec. 2004.*

Labahn, G, Lank, E, MacLean, S, Marzouk, M, and Tausky, D. Math-Brush: A System for Doing Math on Pen-Based Devices. IAPR International Workshop on Document Analysis Systems (2008), 599-606.*

XiangYang Feng, Yasuhisa Okazaki, Yongmin Zhu, "Pen Gestures Based Mathmatics Editing to an ITS on Algebraic Calculation", 2009 First International Workshop on Education Technology and Computer Science, p. 1042-1046.*

K. Jung, K. Kim, A. K. Jain, "Text information extraction in images and video: a survey", Pattern Recognition, p. 977-997, vol. 5. 2004.*

Australian Office Action dated Oct. 12, 2012 (in English) in counterpart Australian Application No. 2011218615.

Chinese Office Action dated Aug. 27, 2013 (and English translation thereof) in counterpart Chinese Application No. 201110253929.1.

Extended European Search Report dated Sep. 12, 2014 issued in counterpart European Application No. 11178949.1.

Japanese Office Action dated Dec. 9, 2014, issued in counterpart Japanese Application No. 2011-072965.

* cited by examiner

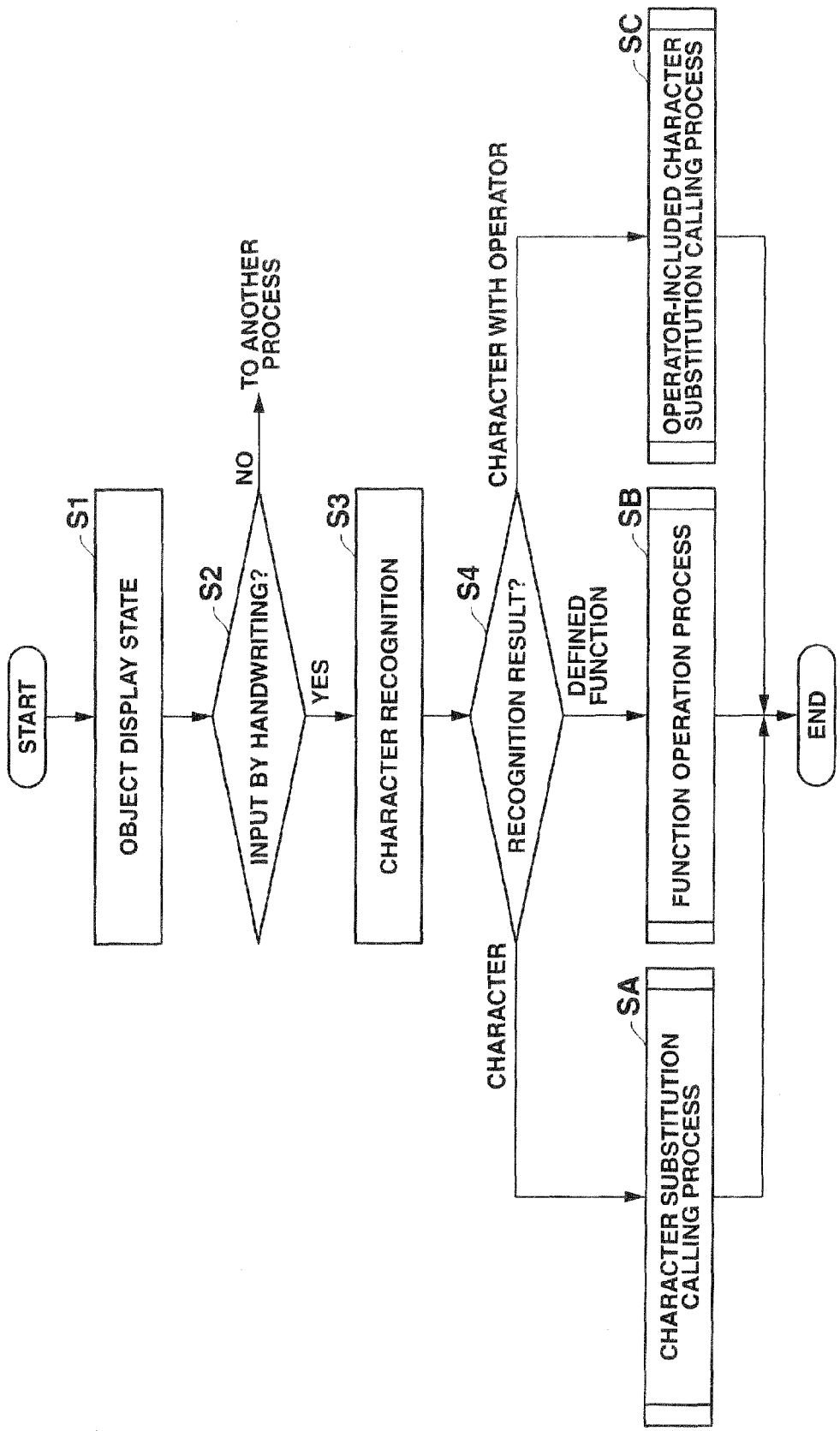

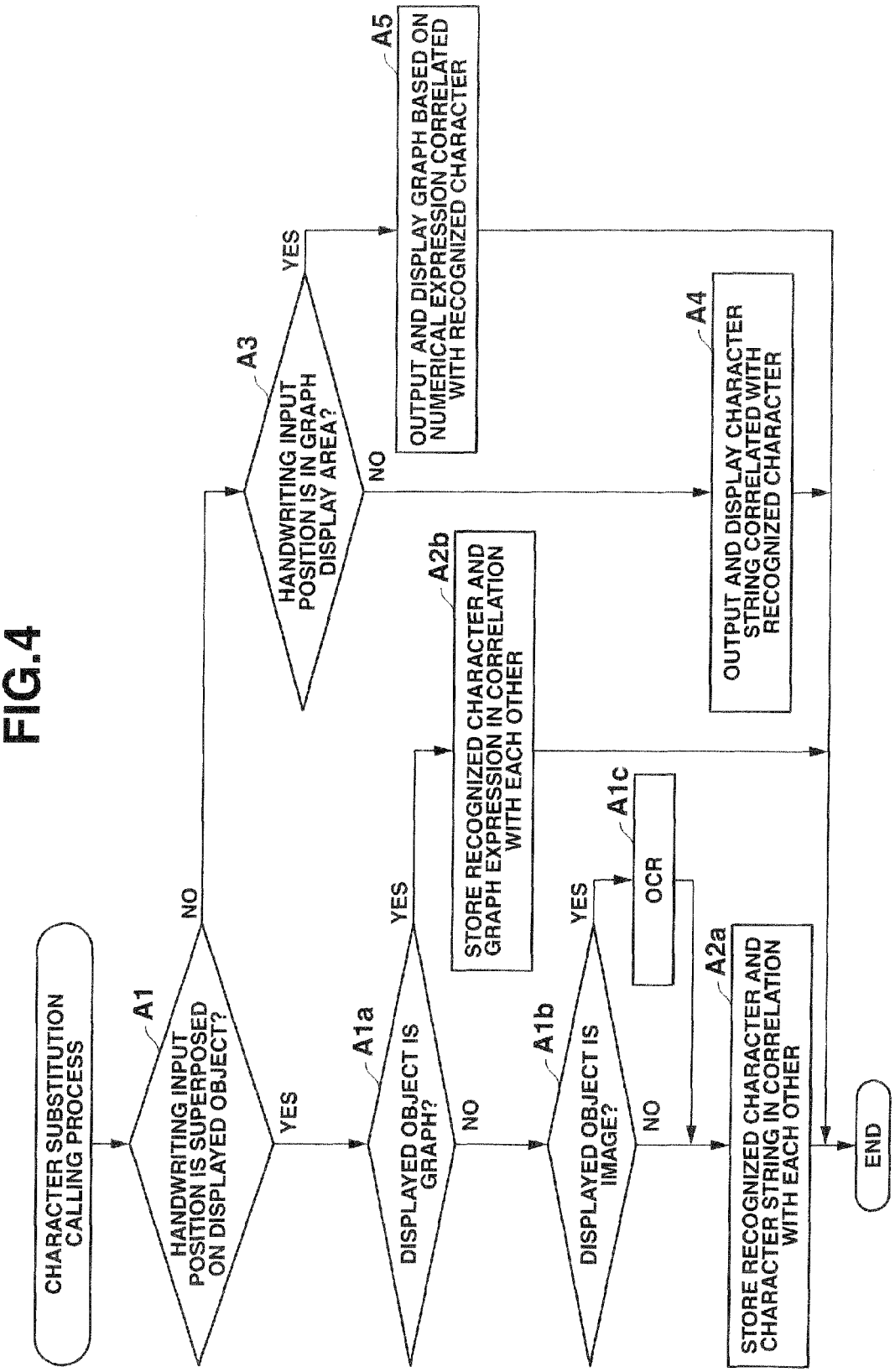

FIG.5A
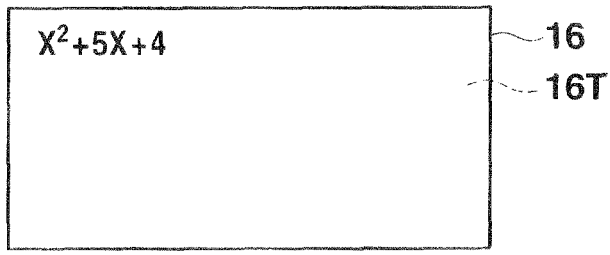
FIG.5B
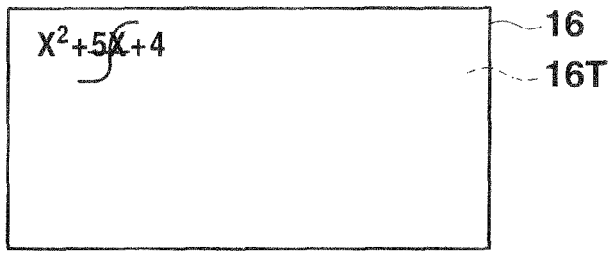
FIG.5C
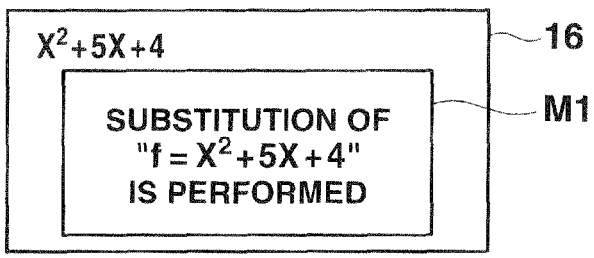
FIG.6

Eq: $D = \int ((X-S)^2 + (Y-T)^2)$ $D = 0$
$X = 0$
$S = 0$
$Y = 0$
$T = 0$
Lower = $-9E+99$
Upper = $9E+99$ 3. The distance formula between two points is
$D = \sqrt{(x_2-x_1)^2 + (x_2-y_1)^2}$. However, you cannot enter subscripts into the calculator, therefore, enter the formula as
$D = \sqrt{(X-S)^2 + (Y-T)^2}$; Where D = distance between the two points; X = x-coordinate of the second points; S = x-coordinate of the first point; Y = y-coordinate of the second point; and T = y-coordinate of the first point.
Press [ALPHA] [sin] [SHIFT] [.] [SHIFT] [$x^2$] [ALPHA] [+]
[ALPHA] [X] [)] [$x^2$] [+] [(] [ALPHA] [-] [ALPHA] [÷]
[ALPHA] [-] [)] [$x^2$] [EXE]

4. Full In D = 0 (even though you are looking for this number). Use point A as having coordinates (S, T) and point B as having coordinates (X, Y).

DISPLAY APPARATUS AND COMPUTER-READABLE MEDIUM

CROSS-REFERENCE TO RELATED APPLICATIONS

This application is based noon and claims the benefit of priority from prior Japanese Patent Applications No. 2010-189687, filed Aug. 26, 2010; and No. 2011-072965, filed Mar. 29, 2011, the entire contents of all of which are incorporated herein by reference.

BACKGROUND OF THE INVENTION

1. Field of the Invention

The present invention relates to a display apparatus which has a function of recognizing handwritten characters, and a computer-readable medium.

2. Description of the Related Art

With the spread of electronic apparatuses equipped with a touch panel, a technique of recognizing handwritten characters is making progress day by day. In addition, various types of characters can be recognized by a function of recognizing handwritten characters. Recently, a technique especially for recognition of handwritten numerical expressions has been developed (for example, see Jpn. Pat. Appln. KOKAI Publication No. 2009-080615).

In the meantime, operation of these electronic apparatuses has become complicated, making them difficult to understand due to the increase in functions of such apparatuses. For example, there is a function of substituting a character string for a character, and calling the character string substituted for the character (substitution and calling function). However, to execute such a function, a plurality of key operations are required for calling the function, thus usability is not good.

In addition, for example, word processors have a function (character converting function) of registering a frequently-used noun or a word of a spelling including a number of characters, which is substituted by a character desired by the user, and calling and displaying the registered word by inputting the substitute character. However, to register a word (character string) to be registered in association with a desired character by the character converting function, it is necessary to perform troublesome operations such as an operation of setting the registering function, operation of inputting the word to be registered, operation of inputting the substitute character, and operation of finishing the registering function; the usability of which is also not good.

BRIEF SUMMARY OF THE INVENTION

Accordingly, it is an object of the present invention to provide a display apparatus and a computer-readable medium, which can easily substitute desired display information by a desired character, and simply call and display the desired display information, by using a handwritten character recognizing function.

According to one aspect of the present invention, there is provided a display apparatus including: a display unit that has a position detection function of detecting a position where the user performs handwriting; a memory; and a processor that performs: an information display control process of causing the display unit to display information in response to user operation; a recognition process of recognizing a locus of a handwriting position which is detected by the position detection function of the display unit; a handwriting position determining process of determining whether the locus of the handwriting position detected by the position detection function is superposed on the information which is displayed on the display unit by the information display control process; an information storing process of storing the displayed information to be correlated with the locus of the handwriting recognized by the recognition process in the memory, when it is determined by the handwriting position determining process that the locus of the handwriting position is superposed on the information which is displayed on the display unit; and an information output process of reading and outputting the information, which is stored in the memory to be correlated with the handwritten locus recognized by the recognition process by the information storing process, when it is determined by the handwriting position determining process that the locus of the handwriting position is not superposed on the information which is displayed on the display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flowchart illustrating an information display operation process using a handwritten character recognizing function of the graph function calculator 10;

FIG. 4 is a flowchart illustrating a character substitution calling process accompanying the information display operation process of the graph function calculator 10;

FIGS. 5A, 5B, and 5C are diagrams illustrating a first substitution display operation accompanying the character substitution calling process of the graph function calculator 10;

FIG. 6 is a diagram illustrating a second substitution display operation accompanying the character substitution calling process of the graph function calculator 10;

FIG. 7 is a diagram illustrating a third substitution display operation accompanying the character substitution calling process of the graph function calculator 10;

DETAILED DESCRIPTION OF THE INVENTION

Embodiments of the present invention will be described below with reference to the drawings.

Figure 1:
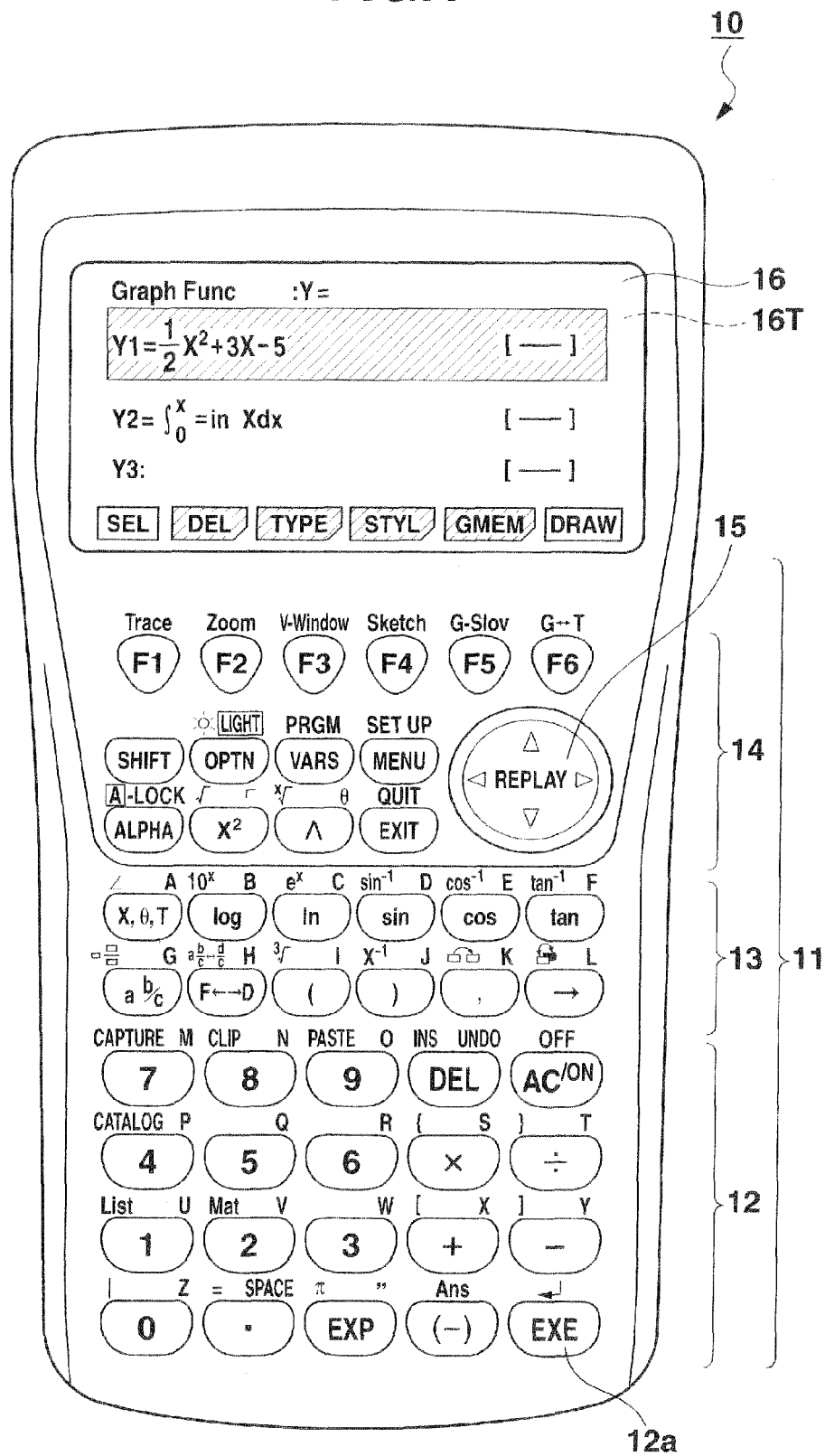
FIG. 1 is a front view illustrating an external appearance structure of a graph function calculator according to an embodiment of a display apparatus of the present invention.

FIG. 1 is a front view illustrating an external appearance of a graph function calculator 10 according to an embodiment of a display apparatus of the present invention.

The function calculator 10 has a small size such that the user can sufficiently hold and operate the calculator 10 by one hand due to the need for portability. A front surface of a main body of the function calculator 10 is provided with a key input unit 11 and a color display unit 16.

The key input unit 11 includes a numeric and operation symbol key group 12, a function key group 13, mode setting key group 14 configured to display menu pictures of various operation modes and command setting of an operation mode, a cursor key 15 configured to perform operation of moving a cursor displayed on a color display unit 16 and selecting a data item, and function keys F1 to F6 configured to selectively designate one of various functions displayed as a menu along a lower end of the color display unit 16.

As the numeral and operation symbol key group 12, keys "0" to "9" (numeric) and keys "+", "−", "×", and "÷" (operation symbols), a key "AC" (all clear), and key "EXE" (execution) 12a are arranged.

As the function key group 13, a key "log" (logarithm), a key "sin" (sine), and a key "ab/c" (fraction) are arranged.

As the mode setting key group 14, a key "Menu", a key "SHIFT", and a key "OPTN" (option) are arranged.

The keys arranged in the numeral and operation symbol key group 12, and the keys arranged in the function key group 13 also function as keys configured to input various characters (symbols) and operators according to respective inscriptions on the main body surface above the respective keys.

The color display unit 16 is formed of a color liquid crystal display unit of the dot-matrix type. A display screen of the color display unit 16 is provided with a touch panel 16T of a transparent tablet for detecting the position where the screen is touched, called the touching position. A locus accompanying a handwritten input to the touch panel 16T is displayed on the color display unit 16 by echo back.

Figure 2:
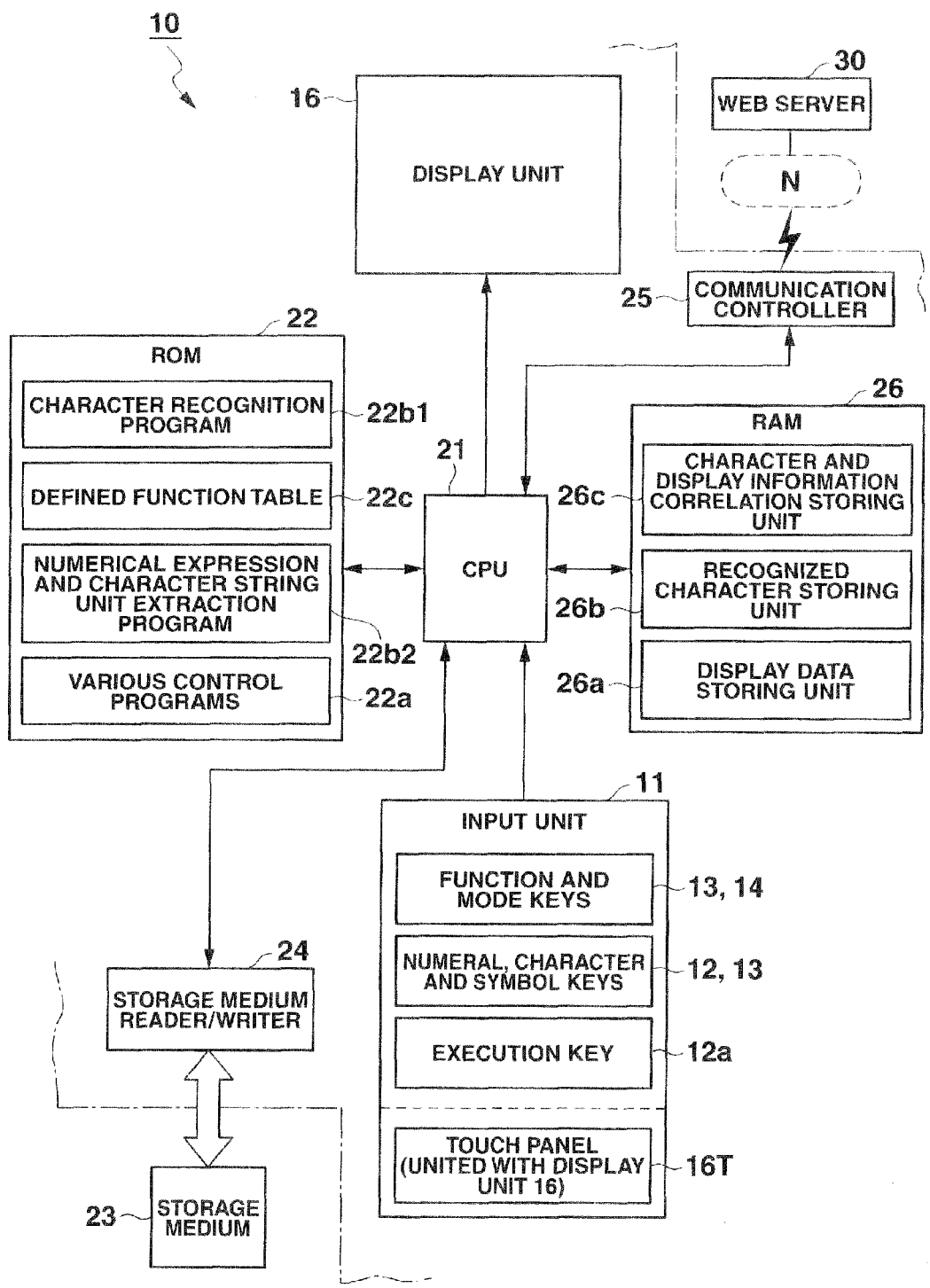
FIG. 2 is a block diagram illustrating a configuration of an electronic circuit of the graph function calculator 10.

FIG. 2 is a block diagram illustrating a configuration of an electronic apparatus of the graph function calculator 10.

The function calculator 10 includes a processor (CPU) 21.

The processor (CPU) 21 controls operations of various units of the circuit, while causing a RAM 26 to store various data or reading various data from the RAM 26, in accordance with a system program which is stored in advance in a ROM 22, a calculator control program which is read from an external storage medium 23 such as a memory card to the ROM 22 by a storage medium reader/writer 24, or a calculator control program which is downloaded and read from a Web server (program server) 30 on a communication network N such as the Internet to the ROM 22 through a communication controller 25.

The system program or the calculator control program stored in the ROM 22 is started in response to a key input signal from the key input unit 11 and a touching position detection signal from the touch panel 16T.

As described above, the processor (CPU) 21 is connected with the color display unit (LCD) 16, in addition to the ROM 22, the storage medium reader/writer 24, the communication controller 25, the RAM 26, the key input unit 11, and the touch panel 16T.

As the calculator control program stored in the ROM 22, various control programs 22a are stored, such as an operation processing program to execute operation processing in accordance with a desired numerical expression input by the user through the key input unit 11 or the touch panel 16T, and a graph drawing processing program to execute graph drawing processing in accordance with the desired numerical expression input by the user.

In addition, as the calculator control program, stored are a character recognition program 22b1 to recognize characters (including symbols) and operators which are input by handwriting to the touch panel 16I, and a numerical expression and character string unit extraction program 22b2 to extract numerical expressions and character strings which are displayed in accordance with the handwritten positions. For example, the extraction unit of the numerical expressions by the program 22b2 is an equation, and the extraction unit of the character strings by the program 22b2 is a word or an idiomatic phrase.

The ROM 22 is provided with a defined function table 22c, which stores a character or a character string desired by the user for calling a function (defined function) that is defined by combining functions executable in accordance with the various control programs 22a by the user.

For example, a character string "factor" is stored in association with a defined function "output a result of factorization", a character string "d/dx" is stored in association with a defined function "differentiate a graph expression for X", and a character string "Solve" is stored in association with a defined function "output a result obtained by solving 'numerical expression=0' for X".

In addition, for example, a character string "Search" is stored in association with a defined function "search dictionary", a character string "Read" is stored in association with a defined function "display pronunciation", and a character string "Zoom" is stored in association with d defined function "enlarge".

The RAM 26 includes a display data storing unit 26a which functions as a frame buffer of the color display unit 16, a recognized character storing unit 26b which stores characters that are recognized in accordance with the character recognition program 22b1, and a character and display information correlation storing unit 26c.

The character and display information correlation storing unit 26c stores, when handwritten characters are input on information displayed on the color display unit 16, the displayed information or a numerical expression relating to the information in association with the handwritten characters input and recognized.

In this process, when the displayed information is a numerical expression and the characters which are input by handwriting and recognized are characters with an operator, an original numerical expression, which has an operation result that is obtained in accordance with the operator and corresponds to the displayed numerical expression, is subjected to an inverse operation, and the numerical expression of the inverse operation result is stored in association with the recognized characters excluding the operator.

In addition, when the displayed information is a graph and the characters which are input by handwriting and recognized are characters with an operator, an original numerical expression which has an operation result that is obtained in accordance with the operator and corresponds to the displayed numerical expression, is subjected to an inverse operation, and the numerical expression of the inverse operation result is stored in association with the recognized characters excluding the operator.

Next, the following is an explanation of an information display operation process using the handwritten character recognizing function of the graph function calculator according to the above structure.

FIG. 3 is a flowchart illustrating an information display operation process using the handwritten character recognizing function of the graph function calculator 10.

In a display state where an object desired by the user is input and a process of the input object can be performed (Step S1), first, it is determined whether a handwritten character is input or not on the display screen of the color display unit 16, based on an input signal from the touch panel 16T (Step S2).

At Step S2, when it is determined that a handwritten character is input based on the fact that a predetermined time has passed since the input signal from the touch panel 16T or the "EXE" (execution) key 12a is input (Step S2 (Yes)), the character recognition program 22b1 is started, and the handwritten character (including a symbol) is subjected to recognition and stored in the recognized character storing unit 26b (Step S3).

Then, it is determined whether the recognized character (or character string) stored in the recognized character storing unit 26b is a character, character stored in the defined function table 22c, or a character with an operator (Step S4).

At Step S4, when it is determined that the recognized character is not a character stored in the defined function table 22c or a character with an operator, the calculator goes to a character substitution calling process illustrated in FIG. 4 (Step SA).

Figure 10:
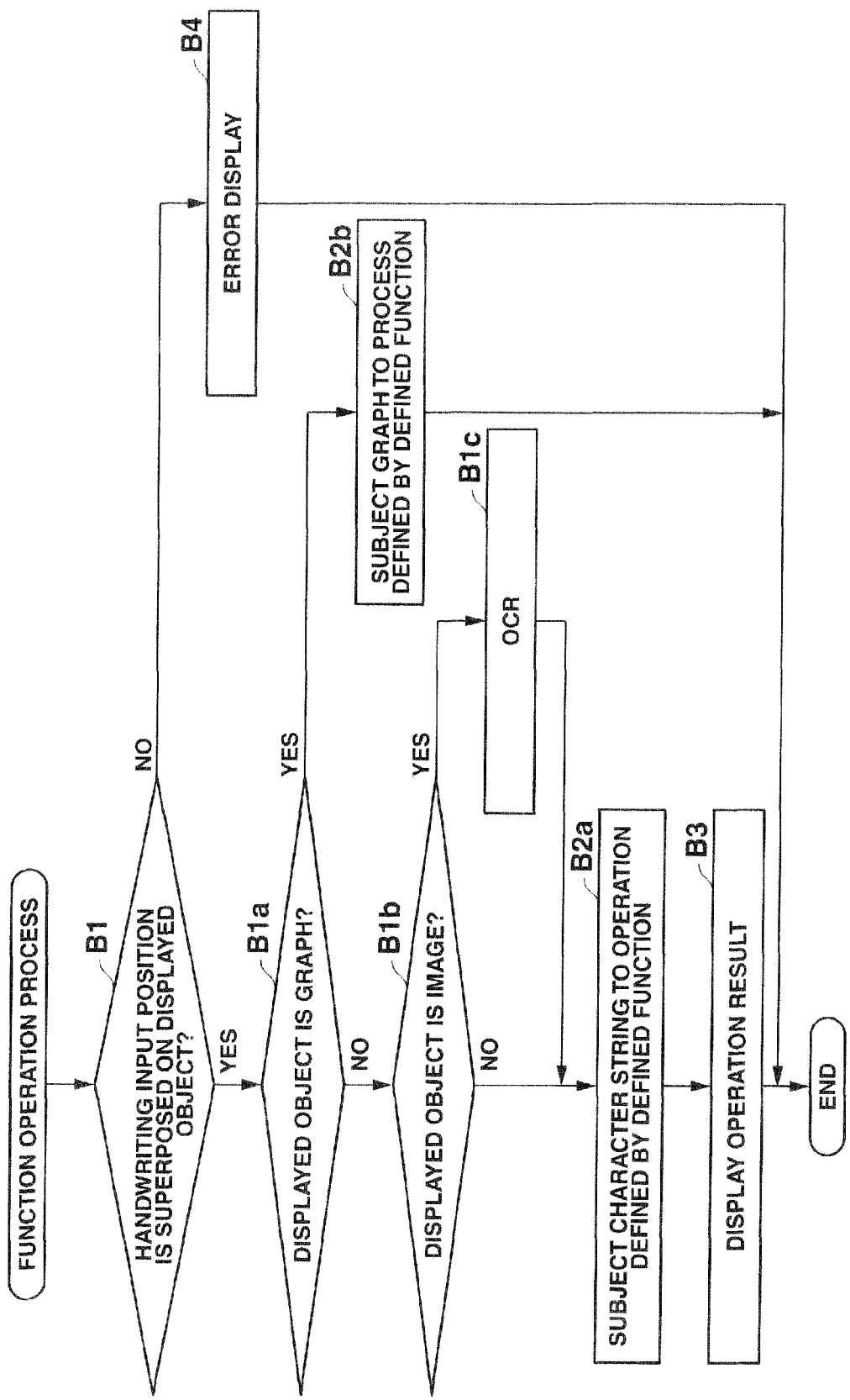
FIG. 10 is a flowchart illustrating a function operation process accompanying the information display operation process of the graph function calculator 10.

When it is determined that the recognized character is a character stored in the defined function table 22c, the calculator goes to a function operation process illustrated in FIG. 10 (Step SB).

Figure 13:
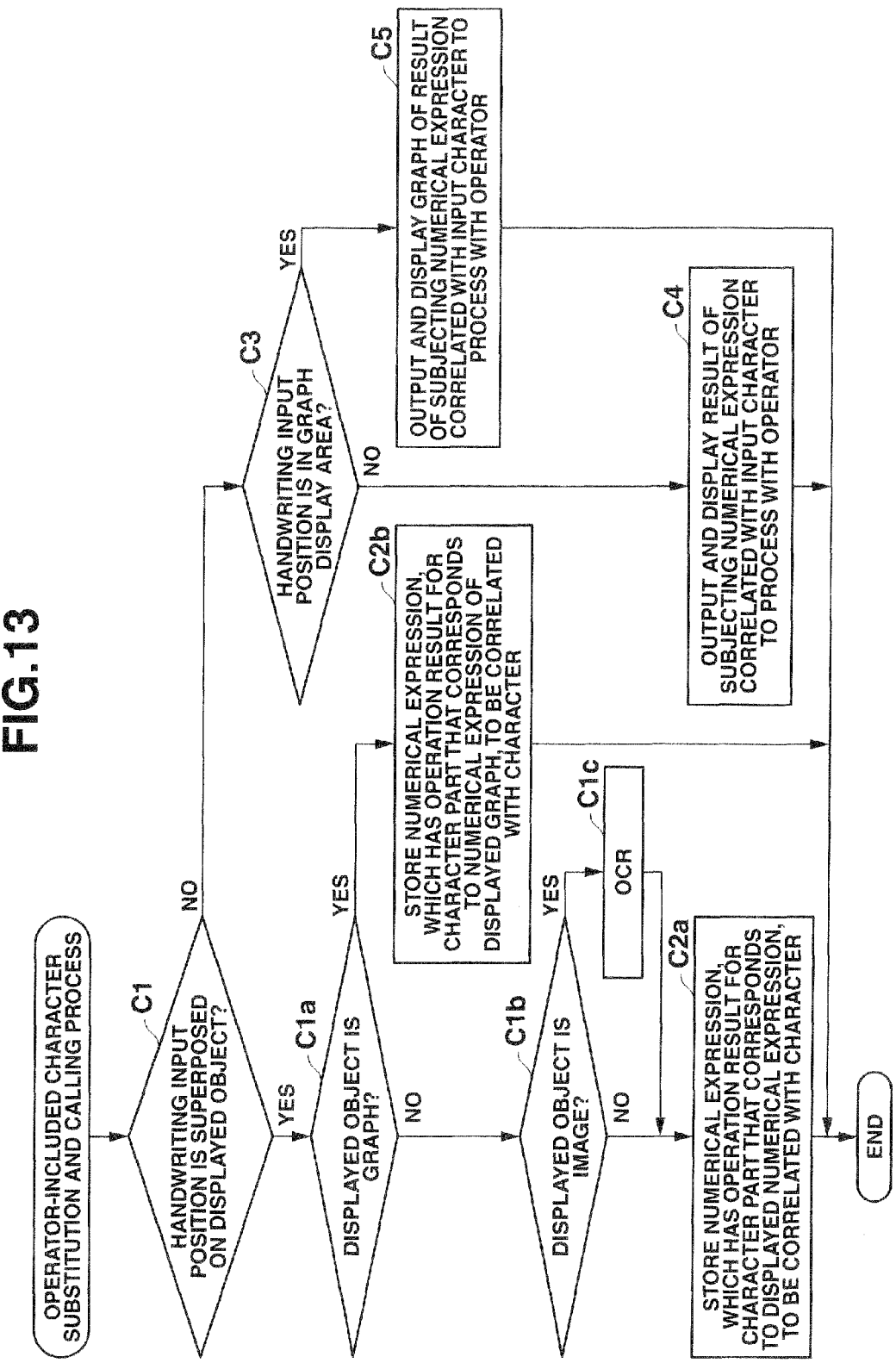
FIG. 13 is a flowchart illustrating an operator-included character substitution calling operation accompanying the information display operation process of the graph function calculator 10.

When it is determined that the recognized character is a character with an operator, the calculator goes to an operator-included character substitution calling process illustrated in FIG. 13 (Step SC).

(Character Substitution Calling Process)

FIG. 4 is a flowchart illustrating a character substitution calling process accompanying the information display operation process of the graph function calculator 10.

FIGS. 5A, 5B, and 5C are diagrams illustrating first substitution display operation accompanying the character substitution calling process of the graph function calculator 10.

For example, as illustrated in FIG. 5A, in a state where a numerical expression "$X^2+5X+4$" desired by the user is input and displayed on the display screen of the color display unit 16 (Step S1), suppose that a handwritten character "f" is input and recognized to be superposed on the numerical expression as illustrated in FIG. 5B (Steps S2 and S3). Since the character "f" is neither a character stored in the defined function table 22c nor a character with an operator, a recognition result thereof is determined as an ordinary character, and the calculator goes to the character substitution calling process illustrated in FIG. 4 (Step S4->SA).

Then, it is determined that a position of the recognized handwritten character "f" is superposed on the displayed numerical expression "$X^2+5X+4$" (Step A1 (Yes)).

Then, it is determined that the displayed numerical expression "$X^2+5X+4$" is neither a graph (Step A1a (No)) nor an image ((Step A1b (No)).

Thereby, the recognized character "f" and the displayed numerical expression "$X^2+5X+4$" are correlated with each other, and stored in the character and display information correlation storing unit 26c (Step A2a).

At this step, as illustrated in FIG. 5C, a message "substitution of f=$X^2+5X+4$ is performed" M1, which indicates that the displayed numerical expression is substituted for the recognized handwritten character f, is displayed on the display screen (16) which displays the numerical expression "$X^2+5X+4$".

FIG. 6 is a diagram illustrating a second substitution display operation accompanying the character substitution calling process of the graph function calculator 10.

For example, as illustrated in FIG. 6, in a state where a text 羅生門-芥川龍之介 (Rashomon-Akutagawa Ryunosuke) . . . " desired by the user is input or read from the storing unit or the exterior and displayed on a text display screen Gt of the color display unit 16 (Step S1), suppose that a handwritten character "α" is input and recognized to be superposed on a part "羅生門 (Rashomon)" of the text (Steps S2 and S3). Since the character "α" is neither a character stored in the defined function table 22c nor a character with an operator, a recognition result thereof is determined as an ordinary character, and the calculator goes to the character substitution calling process illustrated in FIG. 4 (Step S4->SA).

Then, it is determined that a position of the recognized handwritten character "α" is superposed on the displayed text "羅生門-芥川龍之介 (Rashomon-Akutagawa Ryunosuke) . . . " (Step A1 (Yes)).

Thereby, the recognized character "α" and the displayed word "羅生門 (Rashomon)", which is extracted according to the numerical expression and character string unit extraction program 2b2 based on the text position on which the recognized character "α" is superposed, are correlated with each other and stored in the character and display information correlation storing unit 26c (Step A2a).

FIG. 7 is a diagram illustrating a third substitution display operation accompanying the character substitution calling process of the graph function calculator 10.

For example, illustrated in FIG. 7, in a state where an image desired by the user is input or read out from the storing unit or the exterior and displayed on an image display screen Gp of the color display unit 16 (Step S1), suppose that a handwritten character "y" is input and recognized in a state of being superposed on a part of a numerical expression in the image (Steps S2, S3). Since the character "y" is neither a character stored in the defined function table 22c nor a character with an operator, a recognition result thereof is determined as an ordinary character, and the calculator goes to the character substitution calling process illustrated in FIG. 4 (Step S4->SA).

Then, it is determined that a position of the recognized handwritten character "y" is superposed on the displayed image (Step A1 (Yes)).

Then, it is determined that the displayed image is not a graph (Step A1a (No)), but an image (Step A1b (Yes)), and the displayed image is subjected to OCR (optical character recognition), and stored as a character string (Step A1c).

Thereby, the recognized character "y" and successive numerical expression ("D=√...)²"), which is extracted in accordance with the numerical expression and character string unit extraction program 22b2 (or extracted in accordance with range designation by user operation) based on the character position on which the recognized character "y" is superposed, are correlated with each other and stored in the character and display information correlation storing unit 26c (Step A2a).

Figure 8A:
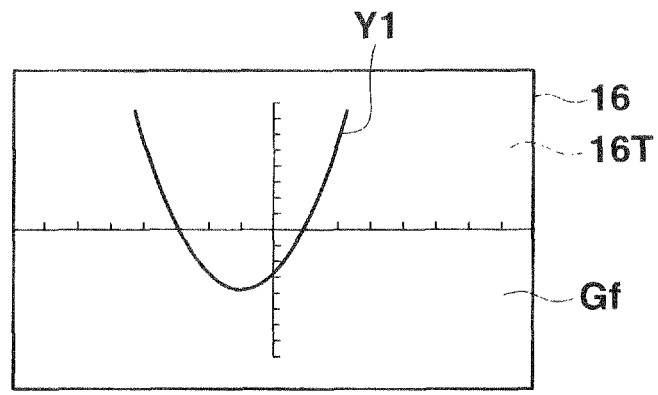
FIGS. 8A, 8B, and 8C are diagrams illustrating a fourth substitution display operation accompanying the character substitution calling process of the graph function calculator 10.
Figure 8B:
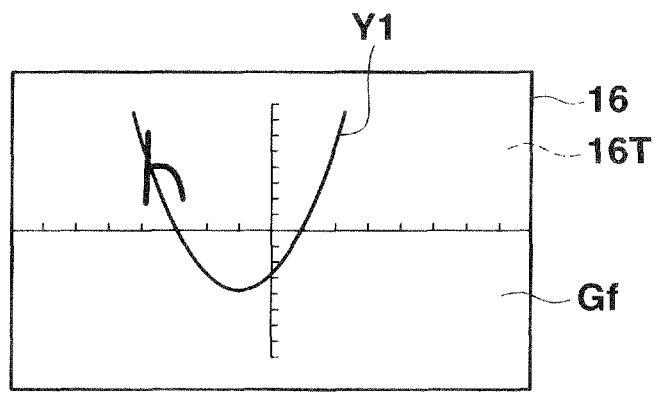
Figure 8C:
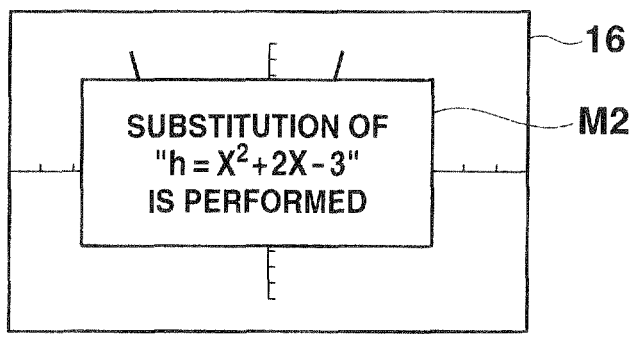

FIGS. 8A, 8B, and 8C are diagrams illustrating a fourth substitution display operation accompanying the character substitution calling process of the graph function calculator 10.

For example, as illustrated in FIG. 8A, in a state where a graph Y1 according to a graph expression "Y1-X²+2X−3" desired by the user is input or read out from the storing unit or the exterior and displayed on a graph display screen Gf of the color display unit 16 (Step S1), suppose that a handwritten character "h" is input and recognized in a state of being superposed on the graph Y1 (Steps S2, S3), as illustrated in FIG. 8B. Since the character "h" is neither a character stored in the defined function table 22c nor a character with an operator, a recognition result thereof is determined as an ordinary character, and the calculator goes to the character substitution calling process illustrated in FIG. 4 (Step S4->SA).

Then, it is determined that a position of the recognized handwritten character "h" is superposed on the displayed graph Y1 (Step A1 (Yes)), and it is determined that the displayed object is a graph (Step A1a (Yes)).

Thereby, the recognized character "h" and the expression "X²+2X−3" of the graph Y1, on which the recognized character "h" is superposed, are correlated with each other, and stored in the character and display information correlation storing unit 26c (Step A2b).

In this process, as illustrated in FIG. 8S, a message M2 "substitution of "h=X²+2X−3" is performed", which indicates that the expression of the displayed graph Y1 is substituted for the recognized handwritten character "h", is displayed on the display screen (16) on which the graph Y1 is displayed.

Also, when a desired character is input by handwriting on the graph Y displayed as an image on the color display unit 16, a graph expression "Y=F(x)" of the graph Y may be analyzed from the image, and thereby the recognized handwritten character and the analyzing graph expression may be stored in correlation (Steps A1 to A2a).

Figure 9A:
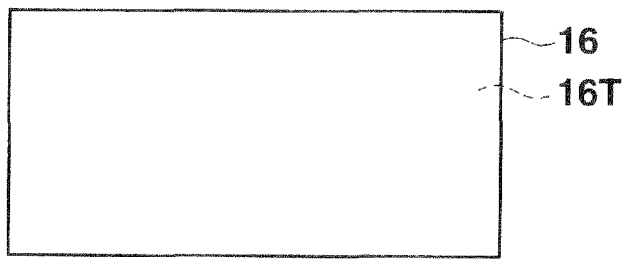
FIGS. 9A, 9B, and 9C are diagrams illustrating a calling display operation accompanying the character substitution calling process of the graph function calculator 10.
Figure 9B:
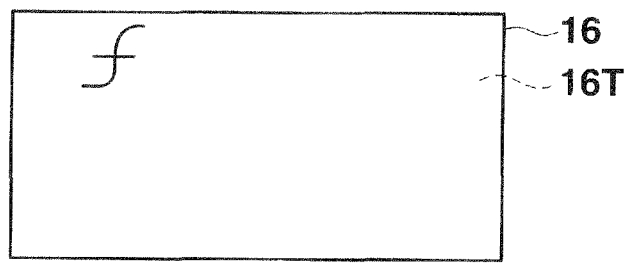
Figure 9C:
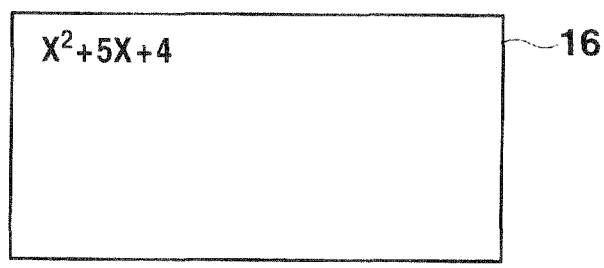

FIGS. 9A, 9B, and 9C are diagrams illustrating a calling display operation accompanying the character substitution calling process of the graph function calculator 10.

For example, after the various substitution display operations illustrated in FIG. 5A to FIG. 8C, suppose that a handwritten character "f" is input and recognized (Steps S2, S3) as illustrated in FIG. 9B, in a display state of the color display unit 16 (Step S1) in which no characters are input as illustrated in FIG. 9A. a recognition result is determined as an ordinary character, and the calculator goes to the character substitution calling process as illustrated in FIG. 4 (Step S4->SA).

Then, it is determined that the recognized handwritten character "f" is not superposed on any display object (Step A1 (No)), and it is also determined that a position of the recognized handwritten character "f" is not on a graph display screen Gf (see FIGS. 8A, 8B, and 8C) (Step A3 (No)).

In this case, since the numerical expression "X²+5X+4" correlated with the recognized character "f" is stored in the character and display information correlation storing unit 26c, the numerical expression "X²+5X+4" which correlated with the recognized character "f" is output and displayed on the display screen of the color display unit 16, as illustrated in FIG. 9C (Step A4).

When a handwritten character "α" is input and recognized in the display screen of the color display unit 16, to which no characters are input as illustrated in FIG. 9A (Steps S1 to SA), the word "羅生門 (Rashomon)" (see FIG. 6) which is correlated with the recognized character "α" and stored in the character and display information correlation storing unit 26c is read out and displayed (Steps A1, A3, A4).

In the same manner, when a handwritten character "y" is input and recognized (Steps S1 to SA) in the display screen of the color display unit 16 to which no characters are input, the numerical expression "D=√...)²" (see FIG. 7) which is stored in the character and display information correlation storing unit 26c and correlated with the recognized character "y" is read out and displayed (Steps A1, A3, AA).

In addition, for example, a handwritten character "h" is input and recognized (Steps S2, S3) in a state where the graph display screen Gf which displays coordinate axes is displayed on the color display unit 16 (Step S1), a recognition result thereof is determined as an ordinary character, and the calculator goes to the character substitution calling process illustrated in FIG. 4 (Step S4->SA).

Then, it is determined that a position of the recognized handwritten character "h" is not superposed on the displayed object (Step A1 (No)), and it is determined that the position of the recognized handwritten character "h" is on the graph display screen Gf (Step A3 (Yes)).

In this case, since the expression "X²+2X−3" which correlated with the recognized character "h" is stored in the character and display information correlation storing unit 26c, the graph Y1 which corresponds to the expression "X²+5X+4" correlated with the recognized character "h" is output and displayed on the display screen of the color display unit 16, as illustrated in FIG. 8B (Step A5).

On the other hand, at Steps A4 and A5, when it is determined that a character string or a graph expression which corresponds to the recognized handwritten character is not stored in the character and display information correlation storing unit 26c, the process of the above steps is not performed.

As described above, when a handwritten character (symbol) is input to be superposed on displayed information such as a desired character string or graph, the displayed information is stored in correlation with the recognized handwritten character. Thereafter, when the same handwritten character is input to an area of the display screen where information is not input, the information correlated with the character is called and displayed. Therefore, it is possible to very easily perform a task of substituting various information for a character, and calling and displaying the information substituted for the character.

(Function Operation Process)

FIG. 10 is a flowchart illustrating a function operation process accompanying the information display operation process of the graph function calculator 10.

Figure 11A:
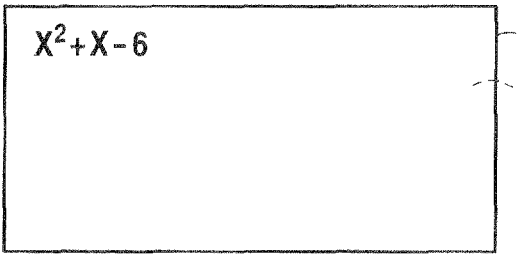
FIGS. 11A, 11B, and 11C are diagrams illustrating a first display operation accompanying the function operation process of the graph function calculator 10.
Figure 11B:
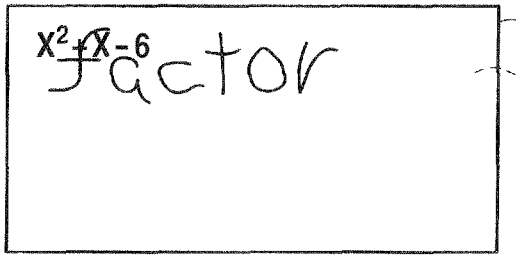
Figure 11C:
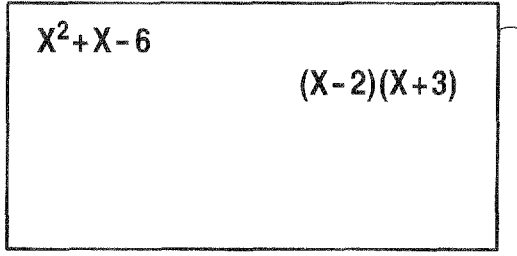

FIGS. 11A, 11B, and 11C are diagrams illustrating a first display operation accompanying the function operation process of the graph function calculator 10.

For example, in a state where an expression "$X^2+X-6$" desired by the user is input and displayed on the display screen of the color display unit 16 as illustrated in FIG. 11A (Step S1), suppose that a handwritten character string "factor" is input and recognized to be superposed on the expression as illustrated in FIG. 11B (Steps S2, S3). It is determined that a recognition result thereof is character string "factor" which is stored in the defined function table 22c, and the calculator goes to the function operation process illustrated in FIG. 10 (Step S4->SB).

Then, it is determined that a position of the recognized handwritten character string "factor" is superposed on the displayed numerical expression "$X^2+X-6$" (Step B1 (Yes)).

Then, it is determined that the displayed numerical expression is neither a graph (Step B1a (No)) nor an image (Step B1b (No)).

Thereby, in accordance with the defined function "output a result of factorization" which is stored in the defined function table 22c and correlated with the recognized character ring "factor", the operation process of factorizing the displayed numerical expression "$X^2+X-6$" is performed (Step B2a), and an operation result "$(X-2)(X-3)$" is output and displayed on the display screen of the color display unit 16 together with the numerical expression, as illustrated in FIG. 11C (Step S3).

In addition, when the character string "Solve", which is stored in the defined function table 22c, is input by handwriting to be superposed on the displayed numerical expression "$X^2+X-6$", it is determined that the position of the recognized handwritten character string "Solve" is superposed on the displayed numerical expression "$X^2+X-6$" (Step B1 (Yes)).

Then, it is determined that the displayed numerical expression is neither a graph (Step B1a (No)) nor an image (Step B1b (No)).

Thereby, in accordance with the defined function "output a result of solving "numerical expression=0" with respect to X" which is stored in the defined function table 22c and correlated with the recognized character string "Solve", the operation process of determining a solution X which satisfies the displayed numerical expression "$X^2+X-6$"=0 is performed (Step B2a). Then, an operation result "$X=2, X=-3$" is output and displayed on the display screen of the color display unit 16 together with the numerical expression "$X^2+X-6$" (Step B3).

In addition, in a state where an image desired by the user is input or read out from the storing unit or the exterior and displayed on the image display screen Gp (see FIG. 7) of the color display unit 16 (Step S1), suppose that a handwritten character string "Zoom" is input and recognized to be superposed on part of a numerical expression in the image (Steps S2, S3). Then, a recognition result thereof is the character string "Zoom" stored in the defined function table 22c, and the calculator goes to the function operation process illustrated in FIG. 10 (Step 34->SB).

Then, it is determined that a position of the recognized handwritten character string "Zoom" is superposed on the displayed image (Step B1 (Yes)).

Then, it is determined that the displayed image is not a graph (Step B1a (No)), but an image (Step B1b (Yes)), and the character is subjected to OCR (optical character recognition) and taken as a character string (Step B1c).

Thereby, in accordance with the defined function "enlarge" which is stored in the defined function table 22c to be correlated with the recognized character string "Zoom", performed is the process of enlarging a successive numerical expression part "$D=\sqrt{...})^2$" which is extracted in accordance with the numerical expression and character string unit extraction program 22b2 (or extracted in accordance with range designation by the user operation) based on the character position on which the recognized character string "Zoom" is superposed (Step B2a). Then, the enlarged numerical expression part "$D=\sqrt{...})^2$" is displayed on the color display unit 16 (Step B3).

Figure 12A:
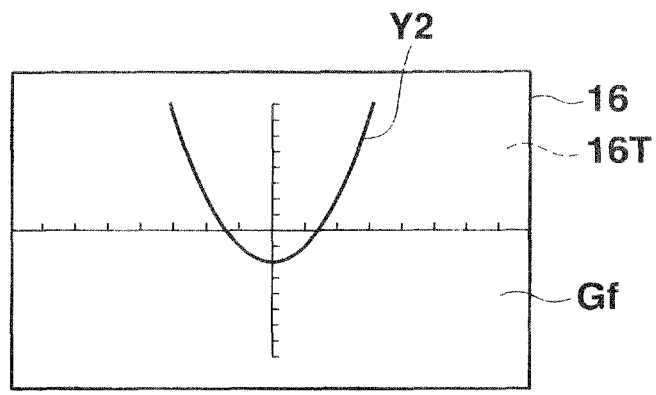
FIGS. 12A, 12B, and 12C are diagrams illustrating a second display operation accompanying the function operation process of the graph function calculator 10.
Figure 12B:
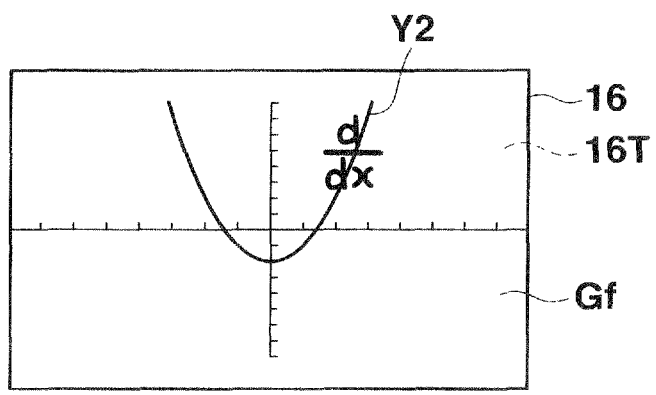
Figure 12C:
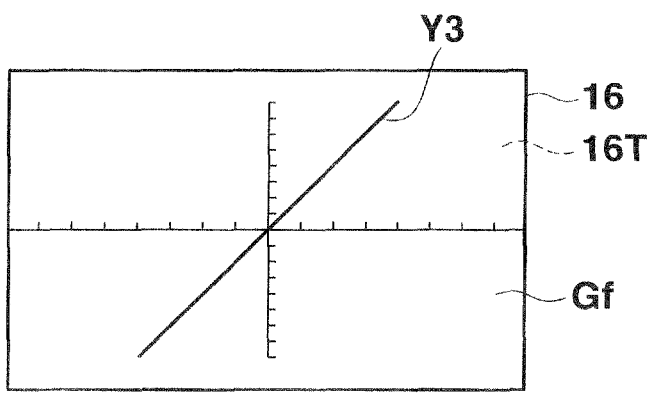

FIGS. 12A, 12B, and 12C are diagrams illustrating a second display operation accompanying the function operation process of the graph function calculator 10.

For example, as illustrated in FIG. 12A, in a state where a graph Y2 according to a graph expression "$Y2=X^2-2$" desired by the user is displayed on the graph display screen Gf of the color display unit 16 (Step S1), suppose that a handwritten character string "d/dx" is input and recognized to be superposed on the numerical expression as illustrated in FIG. 12B (Steps S2, S3). It is determined that a recognition result thereof is the character string "d/dx." stored in the defined function table 22c, and the calculator goes to the function operation process illustrated in FIG. 10 (Step S4->SB).

Then, it is determined that a position of the recognized handwritten character string "d/dx" is superposed on the displayed graph Y1 (Step B1 (Yes)), and it is determined that the displayed object is a graph (Step B1a (Yes)).

Thereby, in accordance with a defined function "differentiate the graph expression with respect to X" which is stored in the defined function table 22c to be correlated with the recognized character string "d/dx", performed is the operation process of differentiating the expression "$Y1=X^2-2$" of the displayed graph Y1 with respect to X. Then, as illustrated in FIG. 12C, a graph Y3 in accordance with an operation result "$Y3=2X$" is output and displayed on the graph display screen Gf the color display unit 16 (Step B2b).

On the other hand, when it is determined at Step B1 that the position of the recognized handwritten characters are not superposed on the displayed object (Step B1 (No)), an error message is displayed (Step B4).

As described above, when a character which is correlated with a preset defined function is input by handwriting to be superposed on displayed information such as a desired character string and graph, the displayed information is subjected to the operation process in accordance with the defined function correlated with the recognized character, and an operation result thereof is displayed. Therefore, it is possible to very easily perform the work of operating on desired information with a predefined function and displaying a result thereof.

(Operator-Included Character Substitution Calling Process)

FIG. 13 is a flowchart illustrating an operator-included character substitution calling process accompanying the information display operation process of the graph function calculator 10.

Figure 14A:
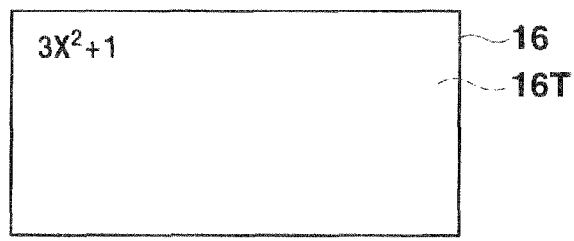
FIGS. 14A, 14B, and 14C are diagrams illustrating a first substitution display operation accompanying the operator-included character substitution calling operation of the graph function calculator 10.
Figure 14B:
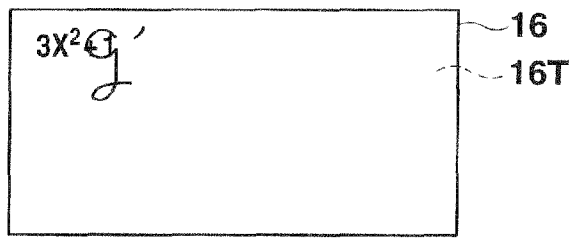
Figure 14C:
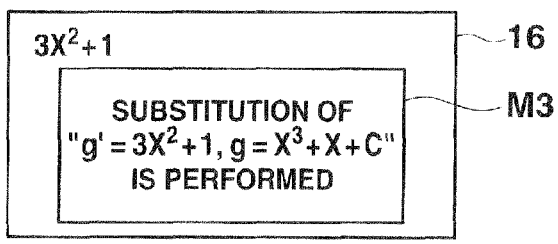

FIGS. 14A, 14B, and 14C are diagrams illustrating a first display operation accompanying the information display operation process of the graph function calculator 10.

For example, as illustrated in FIG. 14A, in a state where a numerical expression "$3X^2+1$" desired by the user is input and displayed on the display screen of the color display unit 16 (Step S1), suppose that a handwritten operator-included character "g" is input and recognized in a state of being superposed on the numerical expression (Steps S2, S3). It is determined that a recognition result thereof is an operator-included character, and the calculator goes to the operator-included character substitution calling process illustrated in FIG. 13 (Step S4->SC).

Then, it is determined that a position of the recognized operator-included handwritten character "g'" is superposed on the displayed numerical expression "$3X^2+1$" (Step C1 (Yes)).

Then, it is determined that the displayed image is neither a graph (Step C1a (No)) nor an image (Step C1b (No)).

Thereby, an original numerical expression, which has an operation result which is obtained by operating the recognized character part "g" in accordance with the recognized operator "'" (differentiation symbol) and corresponds to the displayed numerical expression, is subjected to an inverse operation (that is, the numerical expression "$3X^2-1$" is integrated), and the numerical expression "$X^3+X+C$" (C is a constant of integration) of the operation result is correlated with the recognized character "g" excluding the recognized operator "'" and stored in the character and display information correlation storing unit 26c (Step C2a).

In this process as illustrated in FIG. 14C, a message M3 "substitution of "g'=$3X^2+1$, g=$X^3+X+C$" is performed", which indicates that the displayed numerical expression is substituted for the recognized handwritten operator-included character "g'", is displayed on the display screen (16) on which the numerical expression "$3X^2+1$" is displayed.

For example, when the numerical expression "$3X^2+1$" illustrated in FIG. 14A and FIG. 14$\beta$ is displayed as part of an image, it is determined that the displayed image is not a graph (Step C1a (No)), but an image (Step C1b (Yes)), and the image is subjected to OCR and taken as a character string (Step C1c).

Thereby, in the same manner as above, an original numerical expression, which has an operation result which is obtained by operating the recognized character part "g" in accordance with the recognized operator "'" (differentiation symbol) and corresponds to the displayed numerical expression, is subjected to an inverse operation (that is, the numerical expression "$3X^2+1$" is integrated), and the numerical expression "$X^3+X+C$" (C is a constant of integration) of the operation result is correlated with the recognized character "g" excluding the recognized operator "'" and stored in the character and display information correlation storing unit 26c (Step C2a).

Figure 15A:
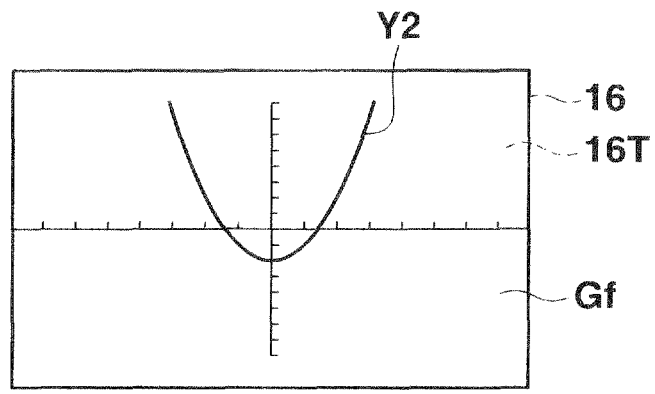
FIGS. 15A, 15B, and 15C are diagrams illustrating a second substitution display operation accompanying the operator-included character substitution calling operation of the graph function calculator 10.
Figure 15B:
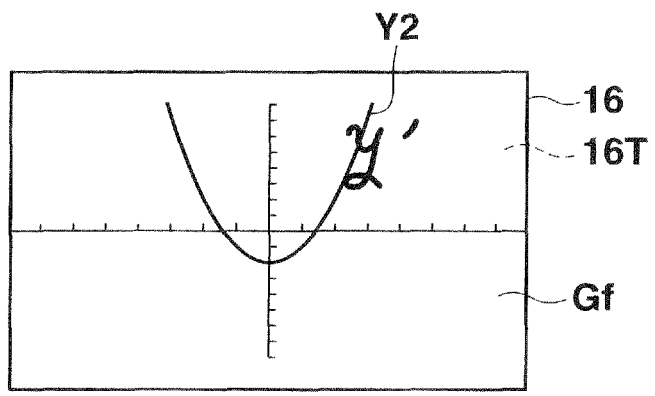
Figure 15C:
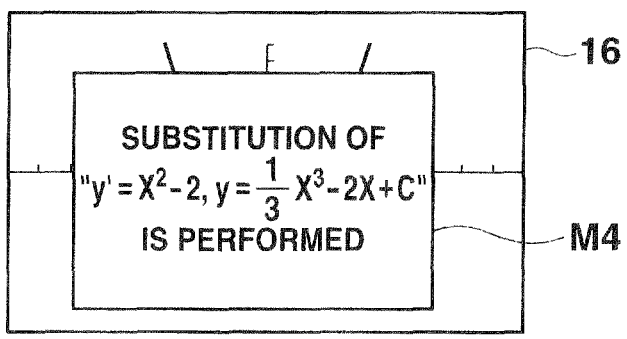

FIGS. 15A, 15B, and 15C are diagrams illustrating a second display operation accompanying the operator-included character substitution calling process of the graph function calculator 10.

For example, as illustrated in FIG. 15A, in a state where the graph Y2 according to a numerical expression "$Y2=X^2-2$" desired by the user is input or read out from the storing unit or the exterior and displayed on the graph display screen Gf of the color display unit 16 (Step S1), suppose that a handwritten operator-included character "y'" is input and recognized in a state of being superposed on the graph Y2 (Steps S2, S3). It is determined that a recognition result thereof is an operator-included character, and the calculator goes to the operator-included character substitution calling process illustrated in FIG. 13 (Step S4->SC).

Then, it is determined that a position of the recognized operator-included handwritten character "y'" is superposed on the displayed graph Y2 (Step C1 (Yes)), and it is determined that the displayed object is a graph (Step C1a (yes)).

Thereby, an original numerical expression, which has an operation result which is obtained by operating the recognized character part "y" in accordance with the recognized operator "'" (differentiation symbol) and corresponds to the numerical expression "$X^2-2$" of the displayed graph Y2, is subjected to an inverse operation (that is, the numerical expression "$X^2-2$" is integrated), and the numerical expression "$(1/3)X^3-2X+C$" (C is a constant of integration) of the operation result is correlated with the recognized character part "y" excluding the recognized operator "'" and stored in the character and display information correlation storing unit 26c (Step C2b).

In this process, as illustrated in FIG. 15C, a message M4 "substitution of "y'=$X^2-2$, y=$(1/3)X^3-2X+C$" is performed", which indicates that the displayed graph is substituted for the recognized handwritten operator-included character "y'", is displayed on the display screen (16) on which the graph Y2 is displayed.

Figure 16A:
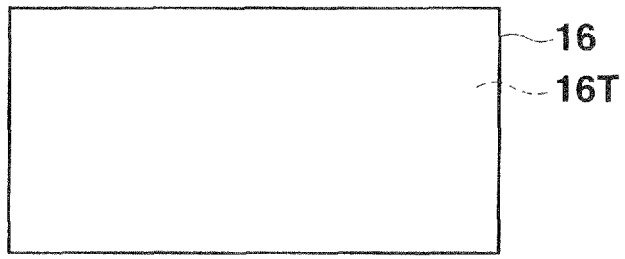
FIGS. 16A, 16B, and 16C are diagrams illustrating a first calling display operation accompanying the operator-included character substitution calling operation of the graph function calculator 10.
Figure 16B:
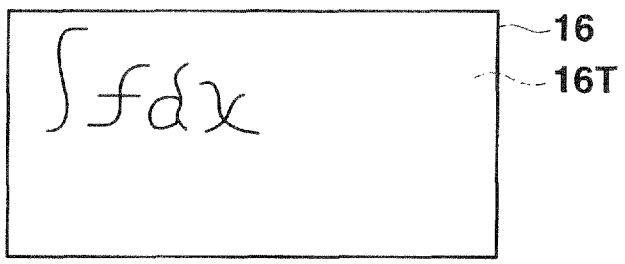
Figure 16C:
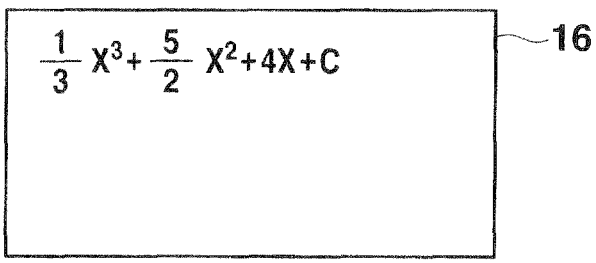

FIGS. 16A, 16B, and 16C are diagrams illustrating first calling display operation accompanying the operator-included character substitution calling process of the graph function calculator 10.

As illustrated in FIG. 16A, in a display state of the color display unit 16 in which no characters are input (Step S1), suppose that an operator-included character "∫fdx" is input by handwriting and recognized as illustrated in FIG. 16B (Steps S2, S3). It is determined that a recognition result thereof is determined as an operator-included character, and the calculator goes to the operator-included character substitution calling process illustrated in FIG. 13 (Step S4->SC).

Then, it is determined that a position of the recognized handwritten operator-included character "∫fdx" is not superposed on any displayed object (Step C1 (No)), and it is determined that the position of the recognized handwritten character "∫fdx" is not on a graph display picture Gf (see FIGS. 15A, 15B, and 15C) (Step C3 (No)).

In this case, since the numerical expression "$X^2+5X+4$" which corresponds to the recognized character "f" is stored in the character and display information correlation storing unit 26c, an operation result "$(1/3)X^3+(5/2)X^2+4X+C$" (C is a constant of integration), which is obtained by operating (integrating) the numerical expression "$X^2+5X+4$" according to the recognized operator "∫dx" (integral symbol), is output and displayed on the display screen of the color display unit 16 as illustrated in FIG. 16C (Step C4).

Figure 17A:
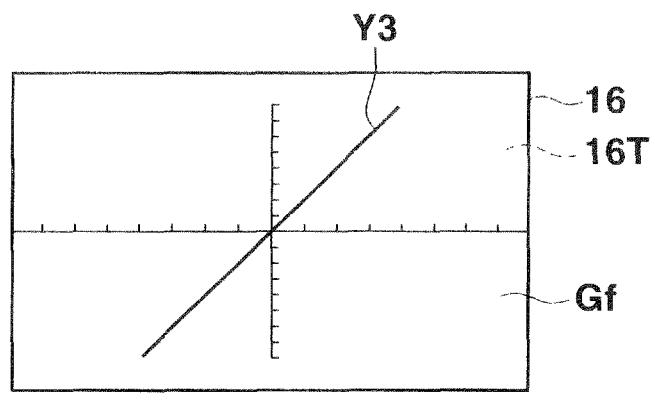
FIGS. 17A, 17B, and 17C are diagrams illustrating a second calling display operation accompanying the operator-included character substitution calling operation of the graph function calculator 10.
Figure 17B:
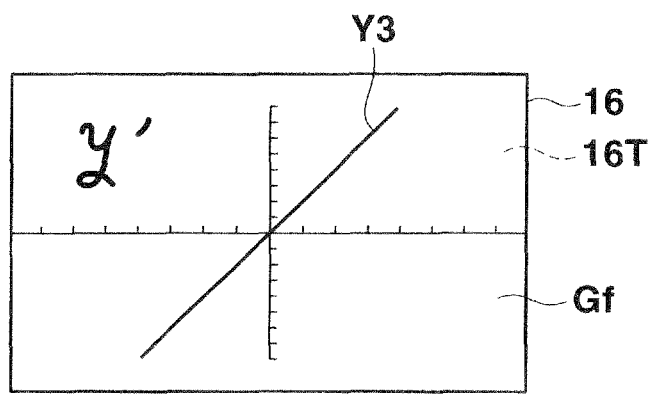
Figure 17C:
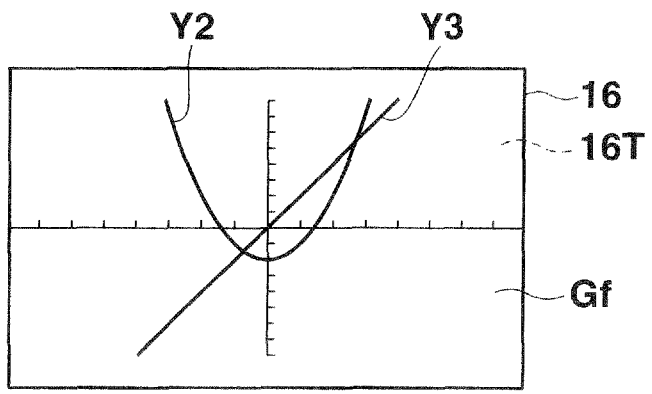

FIGS. 17A, 17B, and 17C are diagrams illustrating a second calling display operation accompanying the operator-included character substitution calling process of the graph function calculator 10.

for example, as illustrated in FIG. 17A, in a display state of the graph display picture Gf in which coordinate axes and a graph Y3 are input to the color display unit 16 (Step S1), suppose that an operator-included character "y'" is input by handwriting and recognized as illustrated in FIG. 17B (Steps S2, S3). It is determined that a recognition result thereof is determined as an operator-included character, and the calculator goes to the operator-included character substitution calling process illustrated in FIG. 13 (Step S4->SC).

Then, it is determined that a position of the recognized handwritten operator-included character "y'" is not superposed on any displayed object (Step C1 (No)), and it is determined that the position of the recognized handwritten character "y'" is on the graph display picture Gf (Step C3 (Yes)).

In this case, since the numerical expression "$(1/3) X^3+2X+C$" which corresponds to the recognized character "y" is stored in the character and display information correlation storing unit 26c, the graph Y2 of an operation result "$X^2-2$" which is obtained by operating (differentiating) the numerical expression "$(1/3) X^3+2X+C$" according to the recognized operator "'" (differentiation symbol) is output and displayed on the graph display picture Gf of the color display unit 16 as illustrated in FIG. 17C (Step C5).

On the other hand, at Steps C4 and C5, when it is determined that the character string or expression which corresponds to the character part of the recognized handwritten operator-included character is not stored in the character and display information correlation storing unit 26c, the process of the related step is not performed.

As described above, when an operator-included character is input by handwriting to be superposed on displayed information such as a desired character string or graph, an original numerical expression which has an operation result that obtained in accordance with the recognized handwritten operator and corresponds to the displayed character string (numerical expression) or an expression of the displayed graph, is subjected to an inverse operation, and operation result thereof is stored to be correlated with the recognized operator-included character excluding the operator. Then, when the same operator-included character is input by handwriting to a non-input area of the display screen, the numerical expression which is correlated with the character without the operator is called, and an operation result of the numerical expression obtained in accordance with the operator is displayed. Therefore, for example, it is possible to very easily perform the work of returning a numerical expression or graph expression subjected to a certain operation to a numerical expression before the operation substituting the numerical expression for a desired character without an operator corresponding to the operation, calling the numerical expression substituted for the character without the operator by inputting the operator-included character by handwriting, and performing an operation according to the operator and displaying an operation result thereof.

Therefore, even in the graph function calculator 10 equipped with various functions and having the above structure, it is possible to easily designate and execute a function desired by the user by gesture operation for the touch-panel color display unit 16, without complicated and troublesome operations.

The operation methods of the graph function calculator 10 described in the above embodiment, that is, methods such as the information display operation process illustrated in the flowchart of FIG. 3, the character substitution calling process accompanying the information display operation process and illustrated in the flowchart of FIG. 4, the function operation process accompanying the information display operation process and illustrated in the flowchart of FIG. 10, and the operator-included character substitution calling process accompanying the information display operation process and illustrated in the flowchart of FIG. 13 may be stored and distributed, as a program executable by a computer, in an external storage medium (23) such as a memory card (such as a ROM card and a RAM card), a magnetic disk (such as a floppy disk and a hard disk), an optical disk (such as a CD-ROM and a DVD), and a semiconductor memory. In addition, the computer (21) of the electronic computer (10) equipped with a handwriting input unit (16T) can realize the information display operation process using the handwritten character recognizing function explained in the above embodiment, and execute a similar process by the above method, by reading the program stored in the external storage medium (23) into the storing device (22), and controlling the operation thereof by the read program.

In addition, data of the program to realize the above method can be transmitted in a form of a program code through a communication network (public line) N. It is possible to realize the information display operation process using the handwritten character recognizing function, by taking the program data into a computer (21) of an electronic computer (10) equipped with a handwriting input unit (16) through a communication device (25) connected to the communication network N.

The present invention is not limited to the above embodiment, but can be variously modified within a range not departing from the gist of the invention. In addition, the above embodiment includes inventions of various stages, and various inventions can be extracted by proper combinations of a plurality of disclosed constituent elements. For example, even when some constituent elements are removed from all the constituent elements disclosed in each embodiment or some of the constituent elements are combined in a different form, the structure in which the constituent elements are removed or combined can be extracted as an invention when it can solve the problem and can obtain effects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
    a display unit that has a position detection function of detecting a position where a user performs handwriting;
    a memory; and
    a processor that performs:
        an information display control process of causing the display unit to display information including at least one of a mathematical expression, a character string, and a graph, in response to a user operation;
        a character recognition process of recognizing a character based on a handwriting locus of a handwriting position which is detected by the position detection function of the display unit;
        a handwriting position determining process of determining whether the handwriting locus, which is recognized as the character, is superposed on the information corresponding to one of a mathematical expression, character string, and graph, which is displayed on the display unit by the information display control process;
        an information storing process of, when it is determined by the handwriting position determining process that the handwriting locus, which is recognized as the character, is superposed on the information corresponding to said one of the mathematical expression, character string, and graph, which is displayed on the display unit, storing in the memory the information corresponding to said one of the mathematical expression, character string, and graph, in correlation with the character recognized by the character recognition process; and
        an information output process of, after the information has been stored in the memory by the information storing process in correlation with the character recognized by the character recognition process and when a handwriting locus is newly input and recognized as the character by the character recognition process which was previously stored in the memory in correlation with the information by the information storing process and it is determined by the handwriting position determining process that the newly input handwriting locus is not superposed on information which is displayed on the display unit, reading and outputting the information corresponding to at least one of a mathematical expression, a character string, and a graph, which was previously stored in the memory by the information storing process in correlation with the character corresponding to the newly input handwriting locus recognized as the character by the character recognition process, wherein the memory comprises a defined function storing unit that stores a defined function, for which an operation process is defined in advance, in correlation with a character, and wherein the processor further performs:

a defined character determining process of determining whether the character recognized by the character recognition process corresponds to a character stored by the defined function storing unit; and a defined function information output process of, when it is determined by the defined character determining process that the recognized character corresponds to the character stored by the defined function storing unit and it is determined by the handwriting position determining process that the handwriting locus is superposed on information corresponding to a mathematical expression which is displayed on the display unit, operating the mathematical expression in accordance with the defined function which is correlated with the character corresponding to the recognized character, and outputting a result of the operation.

2. The display apparatus according to claim 1, wherein the information storing process comprises a character string extracting process of, when it is determined by the handwriting position determining process that the handwriting locus is superposed on information corresponding to a character string displayed on the display unit, extracting the character string from the displayed information on which the handwriting locus is superposed;

wherein the processor stores the character string extracted by the character string extracting process in the memory in correlation with the character recognized by the character recognition process, and wherein, when it is determined by the handwriting position determining process that the handwriting locus is not superposed on the information displayed on the display unit, the information output process reads out and outputs a character string which was previously stored in the memory by the information storing process in correlation with the character recognized by the character recognition process.

3. The display apparatus according to claim 1, wherein the defined function information output process comprises a process of, when it is determined by the defined character determining process that the recognized character corresponds to the character stored by the defined function storing unit and it is determined by the handwriting position determining process that the handwriting locus is superposed on information corresponding to a graph which is displayed on the display unit, operating the graph in accordance with the defined function which is correlated with the recognized character, and outputting a result of the operation as a graph.

4. The display apparatus according to claim 1, wherein the information storing process comprises a character string extracting process of, when it is determined by the handwriting position determining process that the handwriting locus is superposed on information corresponding to an image including a character string displayed on the display unit, extracting the character string by subjecting the image, on which the handwriting locus is superposed, to optical character recognition (OCR).

5. A display apparatus comprising:

a display unit that has a position detection function of detecting a position where a user performs handwriting;

a memory; and a processor that performs:

an information display control process of causing the display unit to display information including at least one of a mathematical expression, a character string, and a graph, in response to a user operation;

a character recognition process of recognizing a character based on a handwriting locus of a handwriting position which is detected by the position detection function of the display unit;

a handwriting position determining process of determining whether the handwriting locus, which is recognized as the character, is superposed on the information corresponding to one of a mathematical expression, character string, and graph, which is displayed on the display unit by the information display control process;

an information storing process of, when it is determined by the handwriting position determining process that the handwriting locus, which is recognized as the character, is superposed on the information corresponding to said one of the mathematical expression, character string, and graph, which is displayed on the display unit, storing in the memory the information corresponding to said one of the mathematical expression, character string, and graph, in correlation with the character recognized by the character recognition process; and an information output process of, after the information has been stored in the memory by the information storing process in correlation with the character recognized by the character recognition process and when a handwriting locus is newly input and recognized as the character by the character recognition process which was previously stored in the memory in correlation with the information by the information storing process and it is determined by the handwriting position determining process that the newly input handwriting locus is not superposed on information which is displayed on the display unit, reading and outputting the information corresponding to at least one of a mathematical expression, a character string, and a graph, which was previously stored in the memory by the information storing process in correlation with the character corresponding to the newly input handwriting locus recognized as the character by the character recognition process, wherein the information storing process comprises a graph determining process of, when it is determined by the handwriting position determining process that the handwriting locus is superposed on the information displayed on the display unit, determining whether the information displayed on the display unit corresponds to a graph, and, when it is determined by the graph determining process that the information displayed on the display unit is a graph, the processor stores a mathematical expression of the graph in the memory in correlation with the character recognized by the character recognition process.

6. The display apparatus according to claim 5, wherein the information output process comprises a graph area determining process of, when it is determined by the handwriting position determining process that the handwriting locus is not superposed on the displayed information, determining whether an area of the handwriting locus is in a graph displayed area, and, when it is determined by the graph area determining process that the area of the handwriting locus is in the graph display area, the processor outputs a graph which corresponds to a mathematical expression which was previously stored by the information storing process in the memory in correlation with the character recognized by the character recognition process.

7. A display control apparatus comprising:
- a display unit that has a position detection function of detecting a position where a user performs handwriting;
- an information display control unit that causes the display unit to display information including at least one of a mathematical expression, a character string, and a graph, in response to a user operation;
- a character recognition unit that recognizes a character based on a handwriting locus of a handwriting position detected by the position detection function of the display unit:
- a handwriting position determining unit that determines whether the handwriting locus, which is recognized as the character, is superposed on information corresponding to one of a mathematical expression, a character string, and a graph, which is displayed on the display unit by the information display control unit;
- an information storing unit that, when it is determined by the handwriting position determining unit that the handwriting locus, which is recognized as the character, is superposed on the information corresponding to said one of the mathematical expression, character string, and graph, which is displayed on the display unit, stores the information corresponding to said one of the mathematical expression, character string, and graph, in correlation with the character recognized by the character recognition unit;
- an information output unit that, after the information has been stored in the memory by the information storing unit in correlation with the character recognized by the character recognition unit and when a handwriting locus is newly input and recognized as the character by the character recognition unit which was previously stored in the memory in correlation with the information by the information storing unit and it is determined by the handwriting position determining unit that the newly input handwriting locus is not superposed on information which is displayed on the display unit, reads and outputs information corresponding to at least one of a mathematical expression, a character string, and a graph, which was previously stored by the information storing unit in correlation with the character corresponding to the newly input handwriting locus recognized as the character by the character recognition unit;
- a defined function storing unit that stores a defined function, for which an operation process is defined in advance, in correlation with a character;
- a defined character determining unit that determines whether the character recognized by the character recognition unit corresponds to a character stored by the defined function storing unit; and
- a defined function information output unit that, when it is determined by the defined character determining unit that the recognized character corresponds to the character stored by the defined function storing unit and it is determined by the handwriting position determining unit that the handwriting locus is superposed on information corresponding to a mathematical expression which is displayed on the display unit, operates the mathematical expression in accordance with the defined function which is correlated with the character corresponding to the recognized character, and outputs a result of the operation.

8. The display control apparatus according to claim 7, wherein the information storing unit comprises a character string extracting unit that, when it is determined by the handwriting position determining unit that the handwriting locus is superposed on information corresponding to a character string displayed on the display unit, extracts the character string from the displayed information on which the handwriting locus is superposed, and the information storing unit stores the character string extracted by the character string extracting unit in correlation with the character recognized by the character recognition unit, and
wherein, when it is determined by the handwriting position determining unit that the handwriting locus is not superposed on the information displayed on the display unit, the information output unit reads out and outputs a character string which was previously stored by the information storing unit in correlation with the character recognized by the character recognition unit.

9. A display control apparatus comprising:
- a display unit that has a position detection function of detecting a position where a user performs handwriting;
- an information display control unit that causes the display unit to display information including at least one of a mathematical expression, a character string, and a graph, in response to a user operation;
- a character recognition unit that recognizes a character based on a handwriting locus of a handwriting position detected by the position detection function of the display unit:
- a handwriting position determining unit that determines whether the handwriting locus, which is recognized as the character, is superposed on information corresponding to one of a mathematical expression, a character string, and a graph, which is displayed on the display unit by the information display control unit;
- an information storing unit that, when it is determined by the handwriting position determining unit that the handwriting locus, which is recognized as the character, is superposed on the information corresponding to said one of the mathematical expression, character string, and graph, which is displayed on the display unit, stores the information corresponding to said one of the mathematical expression, character string, and graph, in correlation with the character recognized by the character recognition unit; and
- an information output unit that, after the information has been stored in the memory by the information storing unit in correlation with the character recognized by the character recognition unit and when a handwriting locus is newly input and recognized as the character by the character recognition unit which was previously stored in the memory in correlation with the information by the information storing unit and it is determined by the handwriting position determining unit that the newly input handwriting locus is not superposed on information which is displayed on the display unit, reads and outputs information corresponding to at least one of a mathematical expression, a character string, and a graph, which was previously stored by the information storing unit in correlation with the character corresponding to the newly input handwriting locus recognized as the character by the character recognition unit, wherein the information storing unit comprises a graph determining unit that, when it is determined by the handwriting position determining unit that the handwriting locus is superposed on the information displayed on the display unit, determines whether the information displayed on the display unit corresponds to a graph, and, when it is determined by the graph determining unit that the information displayed on the display unit is a graph, the information storing unit stores a mathematical expression of the graph in correlation with the character recognized by the character recognition unit.

10. The display control apparatus according to claim 7, wherein the defined function information output unit comprises a unit that, when it is determined by the defined character determining unit that the recognized character corresponds to the character stored by the defined function storing unit and it is determined by the handwriting position determining unit that the handwriting locus is superposed on information corresponding to a graph which is displayed on the display unit, operates the graph in accordance with the defined function which is correlated with the recognized character, and outputs a result of the operation as a graph.

11. The display control apparatus according to claim 7, wherein the information storing unit comprises a character string extracting unit that, when it is determined by the handwriting position determining unit that the handwriting locus is superposed on information corresponding to an image including a character string displayed on the display unit, extracts the character string by subjecting the image, on which the handwriting locus is superposed, to optical character recognition (OCR).

12. The display control apparatus according to claim 9, wherein the information output unit comprises a graph area determining unit that, when it is determined by the handwriting position determining unit that the handwriting locus is not superposed on the displayed information, determines whether an area of the handwriting locus is in a graph displayed area, and, when it is determined by the graph area determining unit that the area of the handwriting locus is in the graph display area, the information output unit outputs a graph which corresponds to a mathematical expression which was previously stored by the information storing unit in correlation with the character recognized by the character recognition unit.

13. A non-transitory computer-readable medium having stored thereon a program that is executable by a computer which comprises a memory and a display unit that has a position detection function of detecting a position where a user performs handwriting, the program being executable by the computer to cause the computer to perform processes comprising:

an information display control process of causing the display unit to display information including at least one of a mathematical expression, a character string, and a graph, in response to a user operation;

a character recognition process of recognizing a character based on a handwriting locus of a handwriting position which is detected by the position detection function of the display unit;

a handwriting position determining process of determining whether the handwriting locus, which is recognized as the character, is superposed on information corresponding to one of a mathematical expression, character string, and graph, which is displayed on the display unit by the information display control process;

an information storing process of, when it is determined by the handwriting position determining process that the handwriting locus, which is recognized as the character, is superposed on the information corresponding to said one of the mathematical expression, character string, and graph, which is displayed on the display unit, storing in the memory the information corresponding to said one of the mathematical expression, character string, and graph, in correlation with the character recognized by the character recognition process;

an information output process of, after the information has been stored in the memory by the information storing process in correlation with the character recognized by the character recognition process and when a handwriting locus is newly input and recognized as the character by the character recognition process which was previously stored in the memory in correlation with the information by the information storing process and it is determined by the handwriting position determining process that the newly input handwriting locus is not superposed on information which is displayed on the display unit, reading and outputting information corresponding to at least one of a mathematical expression, a character string, and a graph, which was previously stored in the memory by the information storing process in correlation with the character corresponding to the newly input handwriting locus recognized as the character by the character recognition process;

a defined function storing process of storing a defined function, for which an operation process is defined in advance, in correlation with a character;

a defined character determining process of determining whether the character recognized by the character recognition process corresponds to a character stored by the defined function storing process; and a defined function information output process of, when it is determined by the defined character determining process that the recognized character corresponds to the character stored by the defined function storing process and it is determined by the handwriting position determining process that the handwriting locus is superposed on information corresponding to a mathematical expression which is displayed on the display unit, operating the mathematical expression in accordance with the defined function which is correlated with the character corresponding to the recognized character, and outputting a result of the operation.

14. A non-transitory computer-readable medium having stored thereon a program that is executable by a computer which comprises a memory and a display unit that has a position detection function of detecting a position where a user performs handwriting, the program being executable by the computer to cause the computer to perform processes comprising:

an information display control process of causing the display unit to display information including at least one of a mathematical expression, a character string, and a graph, in response to a user operation;

a character recognition process of recognizing a character based on a handwriting locus of a handwriting position which is detected by the position detection function of the display unit;

a handwriting position determining process of determining whether the handwriting locus, which is recognized as the character, is superposed on information corresponding to one of a mathematical expression, character string, and graph, which is displayed on the display unit by the information display control process;

an information storing process of, when it is determined by the handwriting position determining process that the handwriting locus, which is recognized as the character, is superposed on the information corresponding to said one of the mathematical expression, character string, and graph, which is displayed on the display unit, storing in the memory the information corresponding to said one of the mathematical expression, character string, and graph, in correlation with the character recognized by the character recognition process; and an information output process of, after the information has been stored in the memory by the information storing process in correlation with the character recognized by the character recognition process and when a handwriting locus is newly input and recognized as the character by the character recognition process which was previously stored in the memory in correlation with the information by the information storing process and it is determined by the handwriting position determining process that the newly input handwriting locus is not superposed on information which is displayed on the display unit, reading and outputting information corresponding to at least one of a mathematical expression, a character string, and a graph, which was previously stored in the memory by the information storing process in correlation with the character corresponding to the newly input handwriting locus recognized as the character by the character recognition process, wherein the information storing process comprises a graph determining process of, when it is determined by the handwriting position determining process that the handwriting locus is superposed on the information displayed on the display unit, determining whether the information displayed on the display unit corresponds to a graph, and, when it is determined by the graph determining process that the information displayed on the display unit is a graph, the information storing process stores a mathematical expression of the graph in correlation with the character recognized by the character recognition process.

\* \* \* \* \*

UNITED STATES PATENT AND TRADEMARK OFFICE
CERTIFICATE OF CORRECTION

| | | |
|---|---|---|
| PATENT NO. | : 9,019,308 B2 | Page 1 of 1 |
| APPLICATION NO. | : 13/214392 | |
| DATED | : April 28, 2015 | |
| INVENTOR(S) | : Kosuke Karoji | |

It is certified that error appears in the above-identified patent and that said Letters Patent is hereby corrected as shown below:

Specification

Column 1, line 7, delete "noon" and insert --upon--.

Claims

Column 17, claim 7, line 11, change "unit:" to --unit;--.

Column 18, claim 9, line 11, change "unit:" to --unit;--.

Signed and Sealed this
Nineteenth Day of January, 2016

Michelle K. Lee
*Director of the United States Patent and Trademark Office*